United States Patent Office 3,753,934
Patented Aug. 21, 1973

3,753,934
PROCESS FOR THE MANUFACTURE OF NEW PLASTICISED MELAMINE-FORMALDEHYDE CONDENSATES
Hermann Diethelm, Aesch Basel-Land, and Roman Gattlen, Basel, Switzerland, assignors to Ciba-Geigy AG, Basel, Switzerland
No Drawing. Filed Sept. 1, 1971, Ser. No. 177,092
Claims priority, application Switzerland, Sept. 7, 1970, 13,322/70
Int. Cl. C08g 9/30
U.S. Cl. 260—17.3           14 Claims

ABSTRACT OF THE DISCLOSURE

A process for the manufacture of new plasticised melamine-formaldehyde condensates by condensing melamine with formaldehyde in an aqueous medium with simultaneous or subsequent addition of a lactam of the Formula I

(I)

(in which R stands for hydrogen or an alkyl group containing 1 to 4 carbon atoms and $n$ is a digit from 3 to 11, both inclusive) and of a sugar, the proportion of the lactam and of the sugar together being 3 to 15% by weight and the proportion of sugar alone being at least 1.5 and at most 7.5% of the weight of the mixture of melamine and formaldehyde, and new plasticised melamine-formaldehyde condensates obtained by the said process. It is preferable to condense melamine with formaldehyde in an aqueous medium in the presence of both a lactam of the Formula I and of a sugar.

---

The manufacture of internally plasticised melamine-formaldehyde condensates by condensing melamine with formaldehyde in an aqueous medium in the presence of a lactam, for example caprolactam, is known. Such plasticised melamine resins are especially suitable for the manufacture of moulding compositions and of solutions of impregnating resins for impregnating substrates made of paper or fabric (compare German Offenlegungsschrift No. 1,595,368 and French patent specification No. 1,576,969).

The period for which such resin solutions can be stored is, however, relatively short. Moreover, the use of caprolactam renders the products expensive. In view of the relatively low softening point the conversion of the resin solutions into powders is difficult, and on being stored the powders tend to cake together.

The present invention is based on the unexpected finding that these disadvantages can be overcome by condensing melamine with formaldehyde in an aqueous medium with simultaneous or subsequent addition of a lactam and of a sugar. The resin solutions obtained in this manner are distinguished by a much better stability on being stored than is found with the solutions of impregnating resins based on melamine, formaldehyde and a lactam alone, as described, for example, in German Offenlegungsschrift No. 1,595,368. Even when a substantial share of the lactam, such as caprolactam, is replaced by a less pricey sugar, an equally good plasticising effect as with lactam alone is achieved, which results in a considerable lowering of the costs.

Furthermore, the softening point of the new plasticised melamine resins is as a rule higher than that of products based on melamine, formaldehyde and lactam alone. Therefore, when the resin is converted into the pulverulent form, for example in an atomising dryer, a larger quantity of resin can be atomised per unit time and when such a powder is stored, it does not tend to caking together.

Moreover, the new plasticised melamine resins possess better impregnating and flow properties because of a higher viscosity of the solutions which proves a special advantage when paper is being coated.

While French patent specification No. 827,014 described condensates of melamine, formaldehyde and a sugar, such as glucose or sucrose, these sugars are by themselves not efficient plasticisers for melamine formaldehyde resins. The expert was, therefore, very surprised to find that in the known plasticised resins based on melamine, caprolactam and formaldehyde, for example, half the proportion by weight of caprolactam could be replaced by a less pricey sugar without encountering disadvantages, such as a lesser plastification, yellowing or impaired stability towards water but that, in fact, even better technical properties were observed.

Accordingly, the present invention provides new, plasticised melamine-formaldehyde condensates which are obtained by condensing melamine with formaldehyde in an aqueous medium with simultaneous or subsequent addition of a lactam of the Formula I (I)        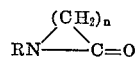

(where R stands for hydrogen or an alkyl group containing 1 to 4 carbon atoms and $n$ is a digit from 3 to 11, both inclusive) and of a sugar, the proportions of lactam and of sugar together making up 3 to 15% of the weight of the mixture of melamine and formaldehyde, and the proportion of the sugar alone being at least 1.5% and at most 7.5% of the weight of the mixture of melamine and formaldehyde.

The condensation of melamine with formaldehyde in an aqueous medium, which is preferably performed in the presence of a lactam of the Formula I and of a sugar, may be carried out by any method known for the manufacture of melamine-formaldehyde condensation products; for example, melamine and formaldehyde are condensed at a molecular ratio of 1:1 to 1:6, preferably of 1:1.5 to 1:2.0.

Apart from melamine, formaldehyde, lactam and sugar the reaction medium may contain up to 20% of other substances capable of forming aminoplasts, such as urea, thiourea, benzoguanamine, toluenesulphonamides, acid amides, also other reactive compounds such as alcohols, glycols and/or amines.

When lactam and sugar are added simultaneously at the beginning of the polycondensation reaction the reaction mixture should contain together 3 to 15%, preferably, from 5 to 10%, of lactam of the Formula I and of sugar, of the weight of the mixture of melamine and formaldehyde. Furthermore, the proportion of sugar alone should be 1.5 to 7.5%, preferably from 2.5 to 5%, of the weight of the mixture of melamine and formaldehyde. The most advantageous weight ratio of lactam to sugar is about 1:1.

An alternative to the preferred condensation of melamine with formaldehyde in an aqueous medium in the presence of a lactam of the Formula I and of a sugar is a first condensation in the presence of a lactam of the Formula I only, the sugar being added afterwards, or else the condensation may be performed in the presence of a sugar and the lactam of the Formula I is added afterwards. Finally, it is possible first to condense melamine with formaldehyde and then only to add a lactam of the Formula I and a sugar.

As appropriate lactams of the Formula I there maybe mentioned; pyrrolidone, N-methylpyrrolidone, capryl lactam, lauryllactam and especially ε-caprolactam.

Appropriate sugars are in the first place monosaccharides and oligosaccharides. To these monosaccharides belong especially hexoses, such as glucose, galactose, mannose, fructose and sorbose, also pentoses, such as arabinose, xylose and ribose.

From among the oligosaccharides there may be mentioned disaccharides, such as saccharose (cane sugar), lactose (milk sugar), maltose (malt sugar) and cellobiose, also trisaccharides such as raffinose and tetrasaccharides, such as stachyose. Preferred sugars are monosaccharides containing 5 or 6 carbon atoms, such as glucose, or disaccharides, such as cane sugar.

The plasticised melamine resin solutions prepared according to this invention may be used as such or preferably in admixture with a suitable accelerator, for example formic acid, ammonium chloride, ammonium sulphate, sodium hydrogenphosphate, ethylene-bis-benzenesulphonate or diethylaminoethanol acetate, as impregnating resin solutions or for the manufacture of moulding compositions. For this purpose the reactants used are melamine, formaldehyde, lactam, sugar and, if desired, any further additives in such proportions that the resulting resin solution has a strength from 30 to 70%, preferably from 50 to 60%. The impregnating resin solutions may be used for impregnating cellulosic substrates or fabrics as used for the manufacture of laminated panels or for the surface coating of wood and wood materials. Suitable substrates are absorbent paper (overlay and decorative papers), fibre fleeces and textile fabrics from native or synthetic fibres. For the manufacture of moulding compositions the impregnating resin solution may first be mixed with a filler, such as cellulose powder, woodmeal, asbestos fibres, glass fibres, pigments and other conventional additives, such as mould separating agents, in an appropriate mixer, whereupon the product is dried and powdered.

Alternatively, the aqueous, if desired, accelerated, resin solution may first be dehydrated in a suitable apparatus, for example in an atomising dryer, to form a pulverulent resin. Such products are suitable, for example, for use as coating resins for the manufacture of surface-treated mouldings from aminoplast moulding compositions, for example based on urea resin or melamine resin, according to the process described in British patent specification No. 913,445 or Swiss patent specification No. 450,715, wherein first a moulding composition based on urea resin or melamine resin is partially cured in the mould, then the granular or pulverulent coating resin is applied to the surface of the object thus formed and the manufacturing process of the moulding is then continued while ensuring that the coating resin caused to melt flows evenly over the surface of the object and the resin spread over it together with the base is cured as a cohesive object having a smooth, shiny and non-staining surface (glaze effect).

Parts and percentages in the following examples are by weight.

EXAMPLE 1

In a three-necked flask equipped with stirrer, thermometer and reflux condenser a cold mixture is prepared from 126.1 g. of melamine (1 mole), 9 g. of ε-caprolactam (corresponding to 5% of the weight of the dry mixture of melamine and formaldehyde) 9 g. of saccharose (crystal sugar, corresponding to 5% of the weight of the dry mixture of melamine and formaldehyde), 180.2 g. of aqueous formaldehyde of 30% strength (1.8 mole) and 5.3 g. of water (to obtain a resin solution of 60% theoretical strength) and the mixture is adjusted with sodiumhydroxide solution to a pH value of 9.2 (which required about 3.6 ml. of N—NaOH). This mixture was heated to 90° C. within 15 to 20 minutes; at this temperature the initially insoluble melamine dissolves. The resin is then condensed at 90° C. until 10 ml. of resin syrup form with 18 ml. of water at 20° C. a milky, permanent turbidity. The condensation is then discontinued by cooling, that is to say the resin syrup (=melamine resin solution A) is cooled back to room temperature within 20 minutes. Any possibly appearing impurities are removed by filtering. A share of the resulting melamine resin solution A was concentrated in a rotary evaporator at 40° C. under vacuum to a solids content of 80%, poured over metal sheets and then dried in a vacuum drying cabinet to a residual moisture of 1% under identical conditions. The glassy foam material thus obtained was triturated in a small mortar dish to a fine powder (=melamine resin powder A). Its softening point, measured on a Kofler heater, was 108° C.

EXAMPLE 2

Proceeding otherwise exactly as in Example 1, 9 g. of ε-caprolactam and 9 g. of crystal sugar are replaced by only 4.5 g. each of ε-caprolactam and crystal sugar (corresponding to 2.5% each of ε-caprolactam and sugar of the weight of the dry mixture of melamine and formaldehyde). Furthermore, no additional 5.3 g. of water were added. The resulting resin syrup (=melamine resin solution B) had properties similar to those described in Example 1.

A share of the melamine resin solution B was dehydrated as in Example 1. The resulting melamine resin powder B had a softening point according to Kofler of 108° C.

EXAMPLE 3

In a three-necked flask equipped with stirrer, thermometer and reflux condenser a cold mixture was prepared of 126.1 g. of melamine (1 mole), 9 g. of ε-caprolactam, 9 g. of glucose (5% of the weight of the dry mixture of melamine and formaldehyde), 180.2 g. of aqueous formaldehyde of 30% strength (1.8 mole) and 5.3 g. of water (to produce a resin solution of 60% theoretical strength) and the mixture was adjusted to a pH value of 9.2 with N-sodium hydroxide solution. This mixture was heated to 90° C. within 15–20 minutes; at this temperature the initially insoluble melamine dissolved. The resin is condensed at 90° C. until 10 ml. of resin syrup with 18 ml. of water at 20° C. produce a milky, permanent turbidity. The condensation is then discontinued by cooling, that is to say the resin syrup is cooled back to room temperature within 20 minutes. Any possibly appearing impurities are filtered off.

EXAMPLE 4

The procedure is otherwise as described in Example 3, but the 9 g. of glucose are replaced by 9 g. of arabinose. The resulting resin syrup has properties similar to those described in Example 3.

EXAMPLE 5

The procedure is exactly as described in Example 1 but ε-caprolactam is replaced by 9 g. of α-pyrrolidone (butyrolactam). The resulting resin syrup has properties similar to those described in Example 1.

EXAMPLE 6

The condensation is carried out as described in Example 1 but the 9 g. of ε-caprolactam and 9 g. of sugar are only added when the resin solution is ready and cold.

A share of this resin solution was dehydrated and pulverised as described in Example 1. The softening point according to Kofler was 104° C.

EXAMPLE 7

The condensation is carried out as described in Example 1 except that the 9 g. of ε-caprolactam are co-condensed and the 9 g. of sugar are stirred into the cold resin solution. The powdered resin has a softening point according to Kofler of 107° C.

EXAMPLE 8

The condensation is carried out as described in Example 1 except that the 9 g. of sugar are co-condensed and the 9 g. of ε-caprolactam are stirred into the cold resin solution.

The powdered resin has a softening point according to Kofler of 105° C.

For comparison the following known melamine resin solutions were prepared:

Melamine resin solution $A_0$

The condensation conditions being otherwise exactly as described in Example 1, the starting mixture consists of 126.1 g. of melamine (1 mole) and 180.2 g. of aqueous formaldehyde of 30% strength (1.8 mole). Accordingly, this mixture contains no ε-caprolactam and no crystal sugar, nor are 5.3 g. of water additionally used.

Dehydration of the melamine resin solution $A_0$ according to Example 1 furnishes a melamine resin powder $A_0$ having a softening point according to Kofler of 110° C.

Melamine resin solution $A_1$

The condensation conditions being otherwise exactly as described in Example 1, there are used 18 g. of ε-caprolactam (corresponding to 10% of the weight of the dry melamine-formaldehyde mixture) instead of 9 g. of ε-caprolactam+9 g. of crystal sugar.

Dehydration of the melamine resin solution $A_1$ according to Example 1 furnishes a melamine resin powder $A_1$ having a Kofler softening point of 104° C.

Melamine resin solution $A_2$

The condensation conditions being otherwise exactly as described in Example 1, there are used 18 g. of crystal sugar (corresponding to 10% of the weight of the dry melamine-formaldehyde mixture) instead of 9 g. of ε-caprolactam+9 g. of crystal sugar.

Dehydration of the melamine resin solution $A_2$ according to Example 1 furnishes a melamine resin powder $A_2$ having a softening point according to Kofler of 109° C.

Melamine resin solution $B_1$

The condensation conditions being otherwise exactly as described in Example 2, 4.5 g. of ε-caprolactam+4.5 g. of crystal sugar are replaced by 9 g. of ε-caprolactam (corresponding to 5% of the weight of the dry melamine-formaldehyde mixture).

Dehydration of the solution furnishes a resin powder which has a softening point according to Kofler of 105° C.

Melamine resin solution $B_2$

The condensation conditions being otherwise exactly as described in Example 2, 4.5 g. of ε-caprolactam+4.5 g. of crystal sugar are replaced by 9 g. of crystal sugar (corresponding to 5% of the weight of the dry melamine-formaldehyde mixture).

The resin powder obtained by dehydrating the solution has a softening point according to Kofler of 109° C.

Comparison of the stability, "B-time" and viscosity of melamine resin solutions according to this invention with those of known melamine resin solution (a) Composition of the resin solutions:

(b) Testing methods:

(I) STABILITY OF THE RESIN SOLUTION

The resin solution is poured into a 150 cc. beaker up to a height of 5 cm., covered with an aluminium foil and stored at 20°±0.2° C. The solution should be visually checked daily for possible changes (turbidity or gelling). Before recording a possible turbidity the solution should be stirred with a glass rod. The solution has gone beyond the standard turbidity when the points on the test plate pushed underneath it are no longer unambiguously recognisable. The test plate is a white decorative laminate with black points produced on it on a typewriter.

(II) MEASURING THE HARDENING TIME OF MELAMINE RESINS ON THE B-TIME PLATE (1) Test gear B-time plate.—Plane, hard-chromed copper block (21.5 x 14.5 x 2 cm.) with 450 watt electric heating. The B-time plate has lateral orifices for inserting a contact thermometer and a mercury thermometer.

Thermostat.—With platinum thermosensor; measuring range: 0° to 330° C.

Wood batten.—30 x 2.4 x 0.4 cm.

Laminate plate.—10 x 10 cm. (melamine resin)

(2) Measuring procedure

A square 9 x 9 cm. is scratched with a pin in the centre of the B-time plate. The plate is then brushed with a mould separating agent.

Measuring the hardening time of resin solutions.—1 ml. of a resin solution of 50 to 60% strength is dropped from a pipette on to the square and evenly distributed over the 81 cm.$^2$ by means of the above-mentioned batten which has first been heated for 1 minute. The resin solution is spread inside this square until it no longer coheres (no drop formation). The curing of the spread-out resin is checked repeatedly by pushing a corner of the quadratic laminate plate into the coating while it is hardening. When on being thus pushed with the laminate plate the resin flakes off, the test is complete. The time elapsed between the brushing and the flaking is read off a stopwatch; it is the hardening time.

Measuring a resin powder.—In principle the resin powder is measured in an identical manner, the B-time plate being brushed with 0.5 g. of resin.

(III) VISCOSITY ACCORDING TO BROOKFIELD

The solution is thermostatically adjusted to a temperature of 20° C. and poured into a 250 cc. beaker (slim shape) and the viscosity is measured:

Instrument _____ Brookfield Viscometer LVF
Spindle _____ 1
Speed _____ 60 revolutions per minute (c) Test results Since unaccelerated melamine resins harden relatively slowly, the B-times of both unaccelerated and accelerated resin solutions were measured. The accelerator used was an aqueous solution of 35% strength of diethylaminoethanol acetate (neutralisation product from 1 mole of 2-diethylaminoethanol and 1 mole of acetic acid); 1% of this accelerator solution (referred to the dry resin) was evenly stirred into the cold resin solution.

| Substance | Melamine resin solution | | | | | | |
|---|---|---|---|---|---|---|---|
| | $A_0$ | A (equals Ex. 1) | $A_1$ | $A_2$ | B (equals Ex. 2) | $B_1$ | $B_2$ |
| Melamine in, moles | 1 | 1 | 1 | 1 | 1 | 1 | 1 |
| Formaldehyde in, moles | 1.8 | 1.8 | 1.8 | 1.8 | 1.8 | 1.8 | 1.8 |
| ε-Caprolactam percent W./W. referred to dry melamine-formaldehyde mixture | | 5 | 10 | | 2.5 | 5 | |
| Crystal sugar percent W./W. referred to dry melamine-formaldehyde mixture | | 5 | | 10 | 2.5 | | 5 |

| | Melamine resin solution | | | | | | |
|---|---|---|---|---|---|---|---|
| | $A_0$ | A (equal Ex. 1) | $A_1$ | $A_2$ | B (equal Ex. 2) | $B_1$ | $B_2$ |
| | Unaccelerated resin solutions | | | | | | |
| Stability (days at 20° C.) | 3 | 25 | 15 | 5 | 10 | 7 | 4 |
| B-time (150° C. secs.) | 480 | 670 | 720 | 450 | 550 | 640 | 750 |
| Viscosity (cp. at 20° C.) | 92 | 85 | 76 | 101 | 87 | 78 | 98 |
| | Accelerated resin solutions | | | | | | |
| B-time (150° C. secs.) | 120 | 140 | 170 | 125 | 175 | 195 | 135 |

These papers were compressed at the press time and temperature shown in the following table to form laminates consisting of 1 sheet of overlay paper
1 sheet of decorative paper
6 sheets of kraft paper, impregnated with a phenol resin The tests for hardening by the staining method and tear strength according to DIN 53 799 carried out with these laminates revealed the following values:

| Press temperature, °C. | Press time, minutes | Staining note/tear strength (DIN 53 799) | | | | | | |
|---|---|---|---|---|---|---|---|---|
| | | $A_0$ | A (equal Ex. 1) | $A_1$ | $A_2$ | B (equal Ex. 2) | $B_1$ | $B_2$ |
| 140 | 15 | 3-4, good | 2-3, good | 3, good | 2-3, good | 3, good | 3, good | 3, good. |
| 150 | 15 | 4-5, crazes | 4, good | 3-4, good | 3-4, good | 4, good | 4, good | 4, good. |
| 160 | 15 | 5-6, cracks | 4, good | 4-5, good | 3-4, crazes | 4-5, good | 5, good | 4, cracks. |

As these results show the two melamine resin solutions A and B ($\epsilon$-caprolactam+saccharose as plasticiser) according to this invention have much better storing stability properties than the corresponding known resin solutions which either contain no plasticiser at all or contain an identical proportion of $\epsilon$-caprolactam alone or of sugar alone as co-condensate. This is a considerable technical advantage in the manufacture of liquid resins. Moreover, the resin solutions A and B according to this invention have a higher viscosity than the known resin solutions $A_1$ and $B_1$ which contain $\epsilon$-caprolactam alone as the plasticising additive. This increased viscosity is of advantage in coating papers.

EXAMPLES OF APPLICATIONS

Example I

Manufacture of decorative laminates.—1% (referred to the dry resin) of an aqueous solution of 35% strength of diethylaminoethanol acetate was added as accelerator to the melamine resin solutions A (Example 1) and B (Example 2). These accelerated resin solutions were then used for impregnating papers.

Furthermore, for comparison papers were impregnated with the similarly accelerated known melamine resin solutions $A_0$, $A_1$, $A_2$, $B_1$ and $B_2$.

The impregnating procedure was as follows: Both overlay and decorative papers were impregnated with the resin solutions, the excess resin was allowed to drip off and the papers were dried to a residual moisture content of 4% to 6% at 110° C. in a drying cabinet with circulating air.

The resin content of the impregnated papers was measured as follows:

A 1 dm.² specimen each was cut out with a circular cutter from the unimpregnated and the impregnated papers and then weighed.

g. of impregnated paper
less g. of unimpregnated paper
―――――――――――――――――――
g. of resin coating Calculation g. of resin coating × 100
――――――――――――――
g. of impregnated paper

| Paper | Unim-pregnated, g./m.² | Impreg-nated, g./m.² | Resin content, percent |
|---|---|---|---|
| Decorative, white | 175 | 350 | 50 |
| Overlay | 40 | 114 | 65 |

Finding the staining note:

Staining solution: 0.1 g. of kiton fast red and 8 g. of concentrated $H_2SO_4$ made up to 1 litre with water.

This solution is raised to the boil and the test specimen is left in it for 10 minutes and then evaluated by its coloration to a test scale in which value 1 = insufficiently hardened
value 4 = ideally hardened
value 7 = overhardened.

The results show that with the resin solutions A and B ($\epsilon$-caprolactam:sugar=1:1) according to this invention an equally plasticising effect or an equally good tear strength is obtained as with the known resin solutions $A_1$ and $B_1$ which contain twice as much of the relatively expensive $\epsilon$-caprolactam as co-condensation ingredient.

Example II

Manufacturing a moulding composition.—The melamine resin solution A (Example 1) was admixed with 1% (referred to the dry resin) of an aqueous solution of 35% strength of diethylaminoethanol acetate as accelerator.

From this accelerated resin solution a moulding composition was prepared in the following manner:

116 g. of melamine resin solution A (accelerated), 29 g. of cellulose powder, 3 g. of zinc sulphide (white pigment; registered trade mark "Sachtolith") and 1 g. of zinc stearate were introduced into a divided trough kneader. These substances were kneaded for 15 minutes at room temperature, then spread in a thin layer over a metal sheet and dried in a vacuum cabinet to a residual moisture content of 3–4% at 40° C. The hardened material was then finely comminuted in a mill.

For comparison a known moulding composition was prepared in otherwise identical conditions but the 116 g. of accelerated melamine resin solution A was replaced by an identical quantity of a similarly accelerated, known melamine resin solution $A_0$.

The two moulding compositions were compressed at 150° C. under a contact pressure of 350 kg./cm.². Compared with the moulding composition from the known resin solution $A_0$ the moulding composition from the resin solution A according to this invention has better flow properties and displays better resistance to cracking in the thermal shock resistance test.

Example III

Surface treatment of mouldings.—1% (referred to dry resin) of an aqueous solution of 35% strength of diethylaminoethanol acetate was added as accelerator to the melamine resin solution A (Example 1). This accelerated resin solution was dehydrated as described in Example 1. The resulting, accelerated powder resin A had a softening point according to Kofler of 108° C. It was used as a so-called glaze for improving the surfaces of melamine resin mouldings.

For comparison powder resins, accelerated in a similar manner, from the known melamine resin solutions $A_0$ and $A_1$ were prepared and used for surface improvement. The accelerated powder resin A had a softening point according to Kofler of 110° C., while the accelerated powder resin $A_1$ had a Kofler softening point of 104° C.

The resin powders were strewn over the surface of the melamine-formaldehyde mouldings prehardened by compression (contact pressure: 350 kg./cm.$^2$; press temperature: 150° C.) and the mouldings were again compressed. The strewn-on powder resin flowed immediately and hardened within 90 seconds to form a hard, scratch-resistant glaze. The mouldings had a high gloss resembling porcelain. The three powder resins give good results, but the powder resins A and $A_1$ plasticised with ε-caprolactam flow especially well, that is to say that even large mouldings can be completely glazed in this manner.

Compared with the powder resin $A_1$, plasticised with ε-caprolactam alone, the powder resin A of this invention, which has been modified with ε-caprolactam+sugar, has a distinctly higher softening point than the resins modified with ε-caprolactam alone. This signifies that a resin according to this invention can be atomised in greater quantities per unit time and so converted into powder form. By virtue of the higher softening point the powder resin A according to this invention tends less to sintering together and is simpler and safer to store than the powder resin $A_1$.

We claim:

1. A process for the manufacture of new plasticised melamine-formaldehyde condensates, wherein melamine is condensed with formaldehyde in an aqueous medium and simultaneously or subsequently a lactam of the formula (I) 

(in which R stands for hydrogen or an alkyl group containing 1 to 4 carbon atoms and $n$ is a digit from 3 to 11, both inclusive) and a sugar are added, the proportions of the lactam and the sugar together making up 3 to 15% of the weight of the mixture of melamine and formaldehyde, and the proportion of sugar is at least 1.5% and at most 7.5% of the weight of the mixture of melamine and formaldehyde.

2. A process according to claim 1, wherein melamine is condensed with formaldehyde in an aqueous medium in the presence of a lactam of the Formula I and of a sugar.

3. A process according to claim 1, wherein mealmine is condensed with formaldehyde in an aqueous medium in the presence of a lactam of the Formula I, whereupon a sugar is added.

4. A process according to claim 1, wherein melamine is condensed with formaldehyde in an aqueous medium in the presence of a sugar, whereupon a lactam of the Formula I is added.

5. A process according to claim 1, wherein melamine is condensed with formaldehyde in an aqueous medium, whereupon a lactam of the Formula I and a sugar are added.

6. A process according to claim 1, wherein ε-caprolactam is used as lactam of the Formula I.

7. A process according to claim 1, wherein the sugar used is a monosaccharide containing 5 or 6 carbon atoms or a disaccharide.

8. A process according to claim 7, wherein the monosaccharide used is glucose or arabinose.

9. A process according to claim 7, wherein the disaccharide used is saccharose.

10. A process according to claim 2, wherein at the beginning of the polycondensation reaction the reaction medium contains 5 to 10% by weight of lactam of the Formula I together with sugar, based upon the weight of the mixture of melamine and formaldehyde.

11. A process according to claim 1, wherein the reaction medium contains 2.5 to 5% of sugar based upon the weight of the mixture of melamine and formaldehyde.

12. A process according to claim 1, wherein the weight ratio of lactam to sugar is about 1:1.

13. A process according to claim 12, wherein melamine is condensed with formaldehyde at a molecular ratio of 1:1 to 1:6, preferably at a molecular ratio of 1:1.5 to 1:2.0.

14. A new, plasticised melamine-formaldehyde condensation product which has been obtained by condensing melamine with formaldehyde in an aqueous medium with the simultaneous or subsequent addition of a lactam of the formula (I) 

(in which R stands for hydrogen or an alkyl group containing 1 to 4 carbon atoms and $n$ is a digit from 3 to 11, both inclusive) and of a sugar, the proportions of the lactam and the sugar together making up 3 to 15% of the weight of the mixture of melamine+formaldehyde, and the proportion of sugar being at least 1.5% and at most 7.5% of the weight of the mixture of melamine+formaldehyde.

References Cited

UNITED STATES PATENTS

| | | | |
|---|---|---|---|
| 3,637,549 | 1/1972 | Hall et al. | 260—17.3 |
| 3,479,247 | 11/1969 | Bonzagni | 260—17.3 |
| 3,501,429 | 3/1970 | Bonzagni | 260—17.3 |

WILLIAM H. SHORT, Primary Examiner

E. WOODBERRY, Assistant Examiner

U.S. Cl. X.R.

117—155 L, 161 LN; 260—67.6 R